W. P. LEAHY.
COMPRESSION COUPLING.
APPLICATION FILED AUG. 18, 1915. RENEWED MAY 26, 1919.
1,327,106.                              Patented Jan. 6, 1920.
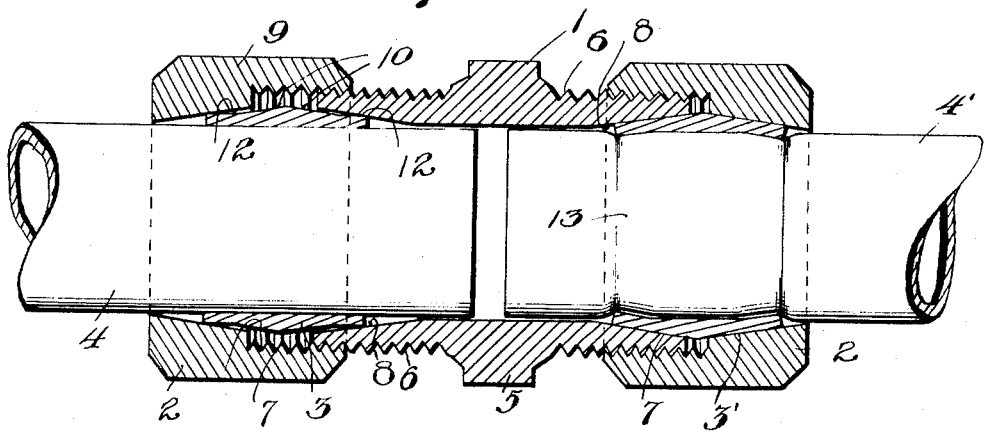
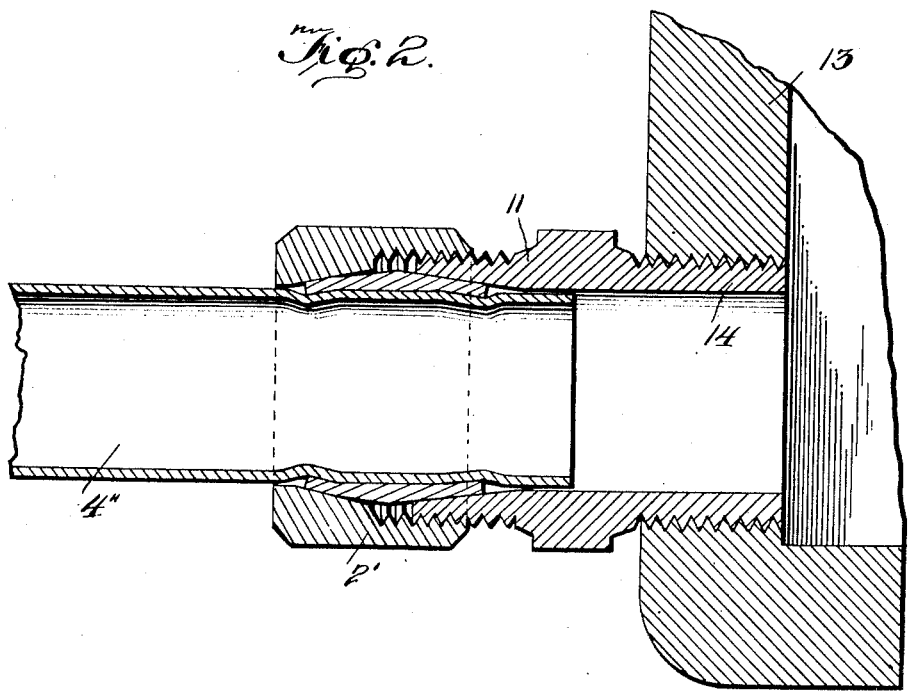
Witness:
Ernest O. Crocker
Inventor:
William P. Leahy
By Harry Frease
Attorney

UNITED STATES PATENT OFFICE.

WILLIAM P. LEAHY, OF CANTON, OHIO, ASSIGNOR, BY MESNE ASSIGNMENTS, OF ONE-HALF TO STEWART S. KURTZ, SR.

COMPRESSION-COUPLING.

1,327,106. Specification of Letters Patent. Patented Jan. 6, 1920.

Application filed August 18, 1915, Serial No. 46,060. Renewed May 26, 1919. Serial No. 299,943.

*To all whom it may concern:*

Be it known that I, WILLIAM P. LEAHY, a citizen of the United States, residing at Canton, in the county of Stark and State of Ohio, have invented certain new and useful Improvements in Compression-Couplings, of which the following is a specification.

The invention relates to improvements in couplings for pipes, cables and the like, of the type in which the ends of the pipes or cables to be joined are impinged and compressed by the coupling in an effort to form a gas-tight joint without the use of solder or the like; and the object of the invention is to provide a coupling in which the compressing action will be positive and efficient, so as to insure a tight joint and firmly grip and hold the parts to be joined together.

The object of the improvement is attained by the use of a thimble around the ends of the pipes having conical peripheral middle portions, and cylindric end portions of substantial thickness adapted to be compressed by the conical inner surfaces of the coupling parts, so that the end portions of the thimble and the corresponding portions of the pipe will be bent inward until the outer surfaces of the thimble fit the conical inner surfaces of the coupling parts, thus forming deep annular indentations at each end of the thimble and giving a barrel shape to the intervening portion of the pipe which may be clamped by the thimble throughout its entire length upon the pipe by the compression of the coupling parts.

The invention, thus briefly set forth, is illustrated in the accompanying drawings, forming part hereof, in which—

Figure 1 is a longitudinal section showing the coupling applied to two sections of pipe, one thimble being compressed and the other thimble in position to be compressed; and Fig. 2, a longitudinal section showing one end of the coupling nipple connected with a tank or the like.

Similar numerals refer to similar parts throughout the drawings.

As shown in Fig. 1, the coupling includes a nipple 1, the nuts 2, and the thimbles 3 and 3', applied to the pipe sections 4 and 4'.

The nipple 1 may be formed with the middle annular body portion 5, the periphery of which may be hexagonal for engagement with a wrench or the like, and the end portions are provided with the peripheral screw threads 6 for engagement with the internal screw threads 7 provided in the inner end portions of the nuts 2.

The middle portion of the inside wall of the nipple is formed to freely fit around the periphery of the pipe sections, whence it is flared outwardly at each end to form the conical portions 8 therein; and the inside wall of the outer portion of each nut is flared inwardly to form the conical portion 8 reversely opposed to the conical portion in the corresponding end of the thimble.

The inner walls of the thimbles 3 are originally made cylindric in form to neatly fit the periphery of the pipe to be coupled; and the middle portion of the periphery of each thimble is originally made with the oppositely tapered conical faces 10, while the end portions of the periphery of each thimble is originally made with the cylindric faces 11; and the parts are so proportioned as to give a substantial thickness to said end portions and also to the rim 12 at each end of the thimble.

The coupling parts are assembled on each pipe section with the thimble between the opposite conical portions of the nut and nipple, and the nut is screwed upon the nipple until the rim portions of the thimble are impinged by the conical portions of the nut and nipple, as shown for the left section of pipe in Fig. 1.

The nut is then screwed further upon the nipple, and in so doing the compressing wedge action of the conical inside portions thereof deflect and bend the end portions of the thimble inward, at the same time deflecting and bending the corresponding annular portions of the pipe sections inward, until the cylindric end faces of the thimbles have been deflected to fit the impinging conical portions of the nut and nipple, which deflection forms the annular grooves 12 in the pipe at each end of the thimble, as shown for the right hand pipe section in Fig. 1.

If the taper of the conical portions of the nut and nipple is the same as that of the peripheral conical faces around the middle of the thimble, as shown in Fig. 1, it is evident that a further screwing of the nut upon the nipple serves to clamp the thimble throughout its length upon the pipe, but if the taper of the conical portion of the nut or nipple is more abrupt than that of the corresponding conical face on the periphery of the thimble, as shown in the nut 2', in Fig. 2, it is evident that by screwing the nut upon the nipple 1', the middle portion as well as the end portion of the thimble will ultimately be deflected and bent inward, so that the inner wall of the thimble, and the corresponding portion of the pipe, will be deflected and bent inward throughout the length of the thimble, thus giving the entire length of the thimble a longitudinally curved or barrel shape, throughout the whole extent of which the thimble may be finally clamped upon the pipe by a further screwing of the nut upon the nipple.

In Fig. 2, the pipe section 4'' is shown to be connected to the wall 13 of a tank or the like, for which purpose one end 14 of the nipple is screwed into and through said wall as shown.

I claim:

1. A compression coupling for pipe or the like including a thimble for neatly fitting the pipe, a nipple for freely fitting the pipe, and a nut to be screwed upon the end of the nipple, the nut and nipple having internal conical faces, and the thimble having middle peripheral conical faces and end peripheral cylindric faces with rims of substantial thickness adapted to be impinged and compressed into the pipe by the conical faces of the nut and nipple, for bending the thimble and corresponding portion of the pipe into barrel shape and clamping the thimble throughout its length upon the pipe.

2. A compression coupling for pipe or the like including a thimble for neatly fitting the pipe, a nipple for freely fitting the pipe, and a nut to be screwed upon the end of the nipple, the nut and nipple having internal conical faces, and the thimble having end peripheral cylindric faces with rims of substantial thickness adapted to be impinged and compressed into the pipe by the conical faces of the nut and nipple, for bending the thimble and corresponding portion of the pipe into barrel shape and clamping the thimble throughout its length upon the pipe.

3. A compression coupling for pipe or the like including a thimble, a nipple, and a nut to be screwed upon the end of the nipple, the nut and nipple having internal conical faces, and the thimble having middle peripheral conical faces and end peripheral cylindric faces with rims of substantial thickness adapted to be impinged and compressed into the pipe by the conical faces of the nut and nipple, for bending the thimble and corresponding portion of the pipe into barrel shape and clamping the thimble throughout its length upon the pipe.

4. A compression coupling for pipe or the like including a thimble, a nipple, and a nut to be screwed upon the end of the nipple, the nut and nipple having internal conical faces, and the thimble having end peripheral cylindric faces with rims of substantial thickness adapted to be impinged and compressed into the pipe by the conical faces of the nut and nipple, for bending the thimble and corresponding portion of the pipe into barrel shape and clamping the thimble throughout its length upon the pipe.

5. A compression coupling for pipe or the like including a thimble for neatly fitting the pipe, a nipple for freely fitting the pipe, and a nut to be screwed upon the end of the nipple, the nut and nipple having internal conical faces, and the thimble having rims of substantial thickness adapted to be impinged and compressed into the pipe by the conical faces of the nut and nipple, for bending the thimble and corresponding portion of the pipe into barrel shape and clamping the thimble throughout its length upon the pipe.

6. A compression coupling for pipe or the like including a thimble, a nipple, and a nut to be screwed upon the end of the nipple, the nut and nipple having internal conical faces, and the thimble having rims of substantial thickness adapted to be impinged and compressed into the pipe by the conical faces of the nut and nipple, for bending the thimble and corresponding portion of the pipe into barrel shape and clamping the thimble throughout its length upon the pipe.

7. In a compression coupling, a thimble having a cylindric bore, and having middle peripheral conical faces and end peripheral cylindric faces, with rims of substantial thickness, and adapted under compression to form a barrel-shaped surface in a pipe.

WILLIAM P. LEAHY.

Witnesses:
ELFRIEDE SCHMIDT,
LOUISE M. CORBY.